US009838425B2

(12) United States Patent
Jalan et al.

(10) Patent No.: US 9,838,425 B2
(45) Date of Patent: Dec. 5, 2017

(54) SYSTEMS AND METHODS FOR NETWORK ACCESS CONTROL (71) Applicant: A10 Networks, Inc., San Jose, CA (US)

(72) Inventors: Rajkumar Jalan, Saratoga, CA (US); Ronald Wai Lun Szeto, San Francisco, CA (US); Steven Wu, San Jose, CA (US)

(73) Assignee: A10 NETWORKS, INC., San Jose, CA (US)

( * ) Notice: Subject to any disclaimer, the term of this patent is extended or adjusted under 35 U.S.C. 154(b) by 0 days.

(21) Appl. No.: 14/261,322

(22) Filed: Apr. 24, 2014

(65) Prior Publication Data

US 2014/0325588 A1 Oct. 30, 2014

Related U.S. Application Data (60) Provisional application No. 61/816,099, filed on Apr. 25, 2013.

(51) Int. Cl.
   H04L 29/06 (2006.01)
(52) U.S. Cl.
   CPC ...... H04L 63/1466 (2013.01); H04L 63/1458 (2013.01); H04L 63/0876 (2013.01); H04L 63/101 (2013.01)
(58) Field of Classification Search
   CPC .............. H04L 63/101; H04L 63/0876; H04L 63/1458; H04L 63/1466
   USPC ........................................................ 726/1
   See application file for complete search history.

(56) References Cited

U.S. PATENT DOCUMENTS

| 4,001,819 | A | 1/1977 | Wise |
| 4,780,905 | A | 10/1988 | Cruts et al. |
| 5,101,402 | A | 3/1992 | Chiu et al. |
| 5,163,088 | A | 11/1992 | LoCascio |
| 5,359,659 | A | 10/1994 | Rosenthal |
| 5,414,833 | A | 5/1995 | Hershey et al. |

(Continued)

FOREIGN PATENT DOCUMENTS

| CN | 1422468 A | 6/2003 |
| CN | 104106241 A | 10/2014 |

(Continued)

OTHER PUBLICATIONS

Oracle Corporation. Oracle Intelligent Agent User's Guide, Release 9.2.0, Part No. A96676-01. Mar. 2002.

(Continued)

*Primary Examiner* — Techane Gergiso
*Assistant Examiner* — Thomas Ho
(74) *Attorney, Agent, or Firm* — AMPACC Law Group LLP; Keith Kline (57) ABSTRACT

Network access control systems and methods are provided herein. A method includes receiving at a network device a SYN packet from a client device over a network, determining if the client device is a trusted source for the network using the SYN packet, if the client device is a trusted resource, receiving an acknowledgement (ACK) packet from the client device that includes identifying information for the client device plus an additional value, and identifying information for the network device, and establishing a connection with the network for the client device.

21 Claims, 8 Drawing Sheets

(56) References Cited

U.S. PATENT DOCUMENTS

| | | |
|---|---|---|
| 5,584,023 A | 12/1996 | Hsu |
| 5,684,875 A | 11/1997 | Ellenberger |
| 5,757,908 A | 5/1998 | Cooper et al. |
| 5,940,002 A | 8/1999 | Finn et al. |
| 5,960,177 A | 9/1999 | Tanno |
| 6,088,804 A | 7/2000 | Hill et al. |
| 6,119,236 A | 9/2000 | Shipley |
| 6,185,681 B1 | 2/2001 | Zizzi |
| 6,205,115 B1 | 3/2001 | Ikebe et al. |
| 6,237,036 B1 | 5/2001 | Ueno et al. |
| 6,249,866 B1 | 6/2001 | Brundrett et al. |
| 6,259,789 B1 | 7/2001 | Paone |
| 6,304,975 B1 | 10/2001 | Shipley |
| 6,324,286 B1 | 11/2001 | Lai et al. |
| 6,347,376 B1 | 2/2002 | Attwood et al. |
| 6,363,486 B1 | 3/2002 | Knapton, III |
| 6,449,651 B1 * | 9/2002 | Dorfman .............. G06F 21/305 |
| | | 235/382 |
| 6,505,192 B1 | 1/2003 | Godwin et al. |
| 6,519,703 B1 | 2/2003 | Joyce |
| 6,594,780 B1 | 7/2003 | Shen et al. |
| 6,715,081 B1 | 3/2004 | Attwood et al. |
| 6,732,279 B2 | 5/2004 | Hoffman |
| 6,735,702 B1 | 5/2004 | Yavatkar et al. |
| 6,754,832 B1 | 6/2004 | Godwin et al. |
| 6,757,822 B1 | 6/2004 | Feiertag et al. |
| 6,779,117 B1 | 8/2004 | Wells |
| 6,988,106 B2 | 1/2006 | Enderwick et al. |
| 7,092,357 B1 | 8/2006 | Ye |
| 7,159,237 B2 | 1/2007 | Schneier et al. |
| 7,194,766 B2 | 3/2007 | Noehring et al. |
| 7,200,760 B2 | 4/2007 | Riebe et al. |
| 7,221,757 B2 | 5/2007 | Alao |
| 7,222,366 B2 | 5/2007 | Bruton, III et al. |
| 7,296,283 B2 | 11/2007 | Hrastar et al. |
| 7,392,241 B2 | 6/2008 | Lin et al. |
| 7,409,712 B1 | 8/2008 | Brooks et al. |
| 7,418,733 B2 | 8/2008 | Connary et al. |
| 7,543,052 B1 | 6/2009 | Cesa Klein |
| 7,565,549 B2 | 7/2009 | Satterlee et al. |
| 7,577,833 B2 | 8/2009 | Lai |
| 7,596,695 B2 | 9/2009 | Liao et al. |
| 7,620,733 B1 | 11/2009 | Tzakikario et al. |
| 7,640,591 B1 | 12/2009 | Tripathi et al. |
| 7,653,633 B2 | 1/2010 | Villella et al. |
| 7,665,138 B2 | 2/2010 | Song et al. |
| 7,739,494 B1 | 6/2010 | McCorkendale et al. |
| 7,739,736 B1 | 6/2010 | Tripathi et al. |
| 7,809,131 B1 | 10/2010 | Njemanze et al. |
| 7,865,954 B1 * | 1/2011 | Phoha .................. H04L 63/1466 |
| | | 709/224 |
| 7,895,649 B1 | 2/2011 | Brook et al. |
| 7,925,766 B2 | 4/2011 | Jayawardena et al. |
| 7,953,855 B2 | 5/2011 | Jayawardena et al. |
| 8,037,532 B2 | 10/2011 | Haswell |
| 8,089,871 B2 | 1/2012 | Iloglu et al. |
| 8,220,056 B2 | 7/2012 | Owens, Jr. |
| 8,239,670 B1 | 8/2012 | Kaufman et al. |
| 8,276,203 B2 | 9/2012 | Nakhre et al. |
| 8,286,227 B1 | 10/2012 | Zheng |
| 8,289,981 B1 | 10/2012 | Wei et al. |
| 8,301,802 B2 | 10/2012 | Wei et al. |
| 8,448,245 B2 | 5/2013 | Banerjee et al. |
| 8,478,708 B1 | 7/2013 | Larcom |
| 8,595,845 B2 | 11/2013 | Basavapatna et al. |
| 8,719,446 B2 | 5/2014 | Spatscheck et al. |
| 8,800,034 B2 | 8/2014 | McHugh et al. |
| 8,806,011 B1 * | 8/2014 | Graham-Cumming H04L 63/1458 |
| | | 709/225 |
| 8,813,228 B2 | 8/2014 | Magee et al. |
| 8,832,832 B1 | 9/2014 | Visbal |
| 8,881,284 B1 | 11/2014 | Gabriel |
| 8,948,380 B2 | 2/2015 | Goto |
| 9,129,116 B1 | 9/2015 | Wiltzius |
| 9,215,208 B2 | 12/2015 | Fraize et al. |
| 9,294,503 B2 | 3/2016 | Thompson et al. |
| 2001/0042204 A1 | 11/2001 | Blaker et al. |
| 2002/0087708 A1 | 7/2002 | Low et al. |
| 2002/0108059 A1 | 8/2002 | Canion et al. |
| 2002/0165912 A1 | 11/2002 | Wenocur et al. |
| 2002/0188839 A1 | 12/2002 | Noehring et al. |
| 2003/0023846 A1 | 1/2003 | Krishna et al. |
| 2003/0028585 A1 | 2/2003 | Yeager et al. |
| 2003/0061507 A1 | 3/2003 | Xiong et al. |
| 2003/0069973 A1 | 4/2003 | Ganesan et al. |
| 2003/0123667 A1 | 7/2003 | Weber et al. |
| 2003/0135625 A1 * | 7/2003 | Fontes .................. H04L 63/12 |
| | | 709/228 |
| 2003/0187688 A1 | 10/2003 | Fey et al. |
| 2003/0196081 A1 | 10/2003 | Savarda et al. |
| 2003/0200456 A1 | 10/2003 | Cyr et al. |
| 2004/0008711 A1 | 1/2004 | Lahti et al. |
| 2004/0054807 A1 | 3/2004 | Harvey et al. |
| 2004/0057579 A1 | 3/2004 | Fahrny |
| 2004/0059943 A1 | 3/2004 | Marquet et al. |
| 2004/0059951 A1 * | 3/2004 | Pinkas et al. .................. 713/202 |
| 2004/0059952 A1 * | 3/2004 | Newport .............. G06Q 20/02 |
| | | 726/3 |
| 2004/0091114 A1 | 5/2004 | Carter et al. |
| 2004/0093524 A1 | 5/2004 | Sakai |
| 2004/0111635 A1 | 6/2004 | Boivie et al. |
| 2004/0143751 A1 | 7/2004 | Peikari |
| 2004/0148520 A1 | 7/2004 | Talpade et al. |
| 2004/0172538 A1 | 9/2004 | Satoh et al. |
| 2004/0242200 A1 | 12/2004 | Maeoka et al. |
| 2005/0021999 A1 * | 1/2005 | Touitou .............. H04L 63/1458 |
| | | 726/11 |
| 2005/0036501 A1 | 2/2005 | Chung et al. |
| 2005/0041584 A1 | 2/2005 | Lau et al. |
| 2005/0044068 A1 | 2/2005 | Lin et al. |
| 2005/0044270 A1 | 2/2005 | Grove et al. |
| 2005/0044352 A1 | 2/2005 | Pazi et al. |
| 2005/0108434 A1 | 5/2005 | Witchey |
| 2005/0125684 A1 | 6/2005 | Schmidt |
| 2005/0180416 A1 | 8/2005 | Jayawardena et al. |
| 2005/0193199 A1 | 9/2005 | Asokan et al. |
| 2005/0198099 A1 | 9/2005 | Motsinger et al. |
| 2005/0210243 A1 | 9/2005 | Archard et al. |
| 2005/0235145 A1 | 10/2005 | Slick et al. |
| 2005/0257093 A1 | 11/2005 | Johnson et al. |
| 2005/0278527 A1 | 12/2005 | Liao et al. |
| 2006/0056297 A1 | 3/2006 | Bryson et al. |
| 2006/0061507 A1 | 3/2006 | Mohamadi |
| 2006/0143707 A1 | 6/2006 | Song et al. |
| 2006/0185014 A1 | 8/2006 | Spatscheck et al. |
| 2006/0206936 A1 | 9/2006 | Liang et al. |
| 2006/0212522 A1 * | 9/2006 | Walter .................. H04L 51/30 |
| | | 709/206 |
| 2006/0230444 A1 | 10/2006 | Iloglu et al. |
| 2006/0251057 A1 | 11/2006 | Kwon et al. |
| 2006/0253902 A1 | 11/2006 | Rabadan et al. |
| 2006/0256716 A1 | 11/2006 | Caci |
| 2006/0265585 A1 | 11/2006 | Lai |
| 2006/0288411 A1 | 12/2006 | Garg et al. |
| 2007/0056038 A1 | 3/2007 | Lok |
| 2007/0073660 A1 * | 3/2007 | Quinlan .............. G06Q 10/107 |
| 2007/0143769 A1 | 6/2007 | Bu et al. |
| 2007/0169194 A1 | 7/2007 | Church et al. |
| 2007/0186282 A1 | 8/2007 | Jenkins |
| 2007/0214088 A1 | 9/2007 | Graham et al. |
| 2007/0280114 A1 | 12/2007 | Chao et al. |
| 2007/0291773 A1 | 12/2007 | Khan et al. |
| 2008/0183885 A1 | 7/2008 | Durrey et al. |
| 2008/0229418 A1 | 9/2008 | Chen et al. |
| 2008/0256623 A1 | 10/2008 | Worley et al. |
| 2009/0049198 A1 | 2/2009 | Blinn et al. |
| 2009/0070470 A1 | 3/2009 | Bauman et al. |
| 2009/0077663 A1 | 3/2009 | Sun et al. |
| 2009/0083537 A1 | 3/2009 | Larsen et al. |
| 2009/0150996 A1 | 6/2009 | Haswell |
| 2009/0168995 A1 | 7/2009 | Banga et al. |
| 2009/0227228 A1 | 9/2009 | Hu et al. |
| 2009/0241190 A1 | 9/2009 | Todd et al. |
| 2009/0287941 A1 | 11/2009 | Shouno |

(56) References Cited

U.S. PATENT DOCUMENTS

| | | |
|---|---|---|
| 2010/0106833 A1 | 4/2010 | Banerjee et al. |
| 2010/0138921 A1 | 6/2010 | Na et al. |
| 2010/0284300 A1 | 11/2010 | Deshpande et al. |
| 2010/0286998 A1 | 11/2010 | Picken |
| 2011/0029599 A1 | 2/2011 | Pulleyn et al. |
| 2011/0082947 A1 | 4/2011 | Szeto et al. |
| 2011/0093785 A1 | 4/2011 | Lee et al. |
| 2011/0131646 A1* | 6/2011 | Park .................. H04L 63/1458 726/13 |
| 2011/0153744 A1 | 6/2011 | Brown |
| 2011/0188452 A1 | 8/2011 | Borleske et al. |
| 2011/0249572 A1 | 10/2011 | Singhal et al. |
| 2011/0282997 A1 | 11/2011 | Prince et al. |
| 2012/0036272 A1 | 2/2012 | El Zur |
| 2012/0042060 A1 | 2/2012 | Jackowski et al. |
| 2012/0096546 A1 | 4/2012 | Dilley et al. |
| 2012/0110472 A1 | 5/2012 | Amrhein et al. |
| 2012/0117646 A1* | 5/2012 | Yoon .................. H04L 63/0254 726/22 |
| 2012/0144461 A1 | 6/2012 | Rathbun |
| 2012/0155274 A1 | 6/2012 | Wang et al. |
| 2012/0163186 A1 | 6/2012 | Wei et al. |
| 2012/0174196 A1 | 7/2012 | Bhogavilli et al. |
| 2012/0226582 A1 | 9/2012 | Hammad |
| 2012/0227109 A1 | 9/2012 | Dimuro |
| 2012/0266242 A1 | 10/2012 | Yang et al. |
| 2013/0019025 A1 | 1/2013 | Chaturvedi et al. |
| 2013/0124713 A1 | 5/2013 | Feinberg et al. |
| 2013/0139245 A1 | 5/2013 | Thomas |
| 2013/0173795 A1 | 7/2013 | McPherson |
| 2013/0198385 A1 | 8/2013 | Han et al. |
| 2013/0198845 A1 | 8/2013 | Anvari |
| 2013/0212265 A1 | 8/2013 | Rubio Vidales et al. |
| 2013/0243194 A1 | 9/2013 | Hawkes et al. |
| 2013/0263256 A1 | 10/2013 | Dickinson et al. |
| 2014/0006508 A1 | 1/2014 | Goyet et al. |
| 2014/0025568 A1 | 1/2014 | Smith et al. |
| 2014/0137190 A1 | 5/2014 | Carey et al. |
| 2014/0258536 A1 | 9/2014 | Chiong |
| 2014/0269308 A1 | 9/2014 | Oshiba |
| 2014/0280832 A1 | 9/2014 | Oshiba |
| 2014/0283065 A1 | 9/2014 | Teddy et al. |
| 2014/0298091 A1 | 10/2014 | Carlen et al. |
| 2014/0310396 A1 | 10/2014 | Christodorescu et al. |
| 2014/0344925 A1 | 11/2014 | Muthiah |
| 2015/0033341 A1 | 1/2015 | Schmidtler et al. |
| 2015/0058977 A1 | 2/2015 | Thompson et al. |
| 2015/0088597 A1 | 3/2015 | Doherty et al. |
| 2015/0143118 A1 | 5/2015 | Sheller et al. |
| 2015/0312268 A1 | 10/2015 | Ray |
| 2015/0333988 A1 | 11/2015 | Jalan et al. |
| 2016/0036651 A1 | 2/2016 | Sureshchandra et al. |

FOREIGN PATENT DOCUMENTS

| | | |
|---|---|---|
| HK | 1198848 A | 6/2015 |
| TW | 375721 | 12/1999 |
| TW | 477140 | 2/2002 |
| TW | 574655 | 2/2004 |
| TW | NI197237 | 2/2004 |
| TW | I225999 | 1/2005 |
| TW | I241818 | 10/2005 |
| TW | I252976 | 4/2006 |
| WO | WO9842108 | 9/1998 |
| WO | WO2006039529 | 4/2006 |
| WO | WO2013112492 A1 | 8/2013 |
| WO | WO2014150617 | 9/2014 |
| WO | WO2014151072 | 9/2014 |
| WO | WO2014176461 | 10/2014 |
| WO | WO2015030977 | 3/2015 |

OTHER PUBLICATIONS

SOL11243. iRules containing the RULE_INIT iRule event do not re-initialize when a syntax error is corrected. f5.support.com. May 24, 2010.

Mutz, "Linux Encryption How to," available at http://encryptionhowto.sourceforge.net/Encryption-HOWTO-1.html.

Ganesan et al., "YAPPERS: a peer-to-peer lookup service over arbitrary topology," IEEE, pp. 1250-1260, Mar. 30-Apr. 3, 2003.

Annexstein et al., "Indexing Techniques for File Sharing in Scalable Peer-to-Peer Networks," IEEE, pp. 10-15, Oct. 14-16, 2002.

Ling et al., "A Content-Based Resource Location Mechanism in PeerIS," IEEE, pp. 279-288, Dec. 12-14, 2002.

Obimo et al., "A parallel algorithm for determining the inverse of a matrix for use in blockcipher encryption/decryption," Journal of Supercomputing, vol. 39, No. 2, pp. 113-130, Feb. 2007.

Long et al., "ID-based threshold decryption secure against adaptive chosen-ciphertext attack," Computers and Electrical Engineering, vol. 33, No. 3, pp. 166-176, May 2007.

Popek, Gerald J., "Encryption and Secure Computer Networks," Computing Surveys, vol. 11, No. 4, pp. 1-26, Dec. 1979.

Dainotti, Albert et al., "TIE: A Community-Oriented Traffic Classification Platform," May 11, 2009, Springer-Verlag, Traffic Monitoring and Analysis: Proceedings First International Workshop, TMA 2009. pp. 64-74. Retrieved from: Inspec. Accession No. 11061142.

Dainotti, Albert et al., "Early Classification of Network Traffic through Multi-Classification," Apr. 27, 2011, Springer Verlag, Traffic Monitoring and Analysis, Proceedings of the Third International Workshop, TMA 2011. pp. 122-135. Retrieved from Inspec. Accession No. 12232145.

Liebergeld, Steffen et al., "Cellpot: A Concept for Next Generation Cellular Network Honeypots," Internet Society, Feb. 23, 2014, pp. 1-6.

"How to Create a Rule in Outlook 2003" CreateaRule-Outlook2003.doc 031405 mad, 3 pages.

Guo, Yuan-ni et al., "An Embedded Firewall System Design Based on Ptolemy II," Journal of System Simulation, vol. 16 No. 6, pp. 1361-1363, Jun. 2004.

Huang, Quan et al., "An Embedded Firewall Based on Network Processor," IEEE, 2nd International Conference on Embedded Software and Systems, 7 pages, Dec. 16-18, 2005.

Ihde, Michael et al., "Barbarians in the Gate: An Experimental Validation of NIC-Based Distributed Firewall Performance and Flood Tolerance," IEEE, International Conference on Dependable Systems and Networks, Jun. 25-28, 2006, 6 pages.

Susilo, W. et al., "Personal Firewall for Pocket PC 2003: Design & Implementation," IEEE 19th International Conference on Advanced Information Networking and Applications, vol. 2 pp. 661-666, Mar. 28-30, 2005.

* cited by examiner

SYSTEMS AND METHODS FOR NETWORK ACCESS CONTROL

CROSS REFERENCE TO RELATED APPLICATIONS

This non-provisional U.S. patent application claims the priority benefit of U.S. Provisional Application Ser. No. 61/816,099, filed on Apr. 25, 2013, which is hereby incorporated by reference herein in its entirety, including all references cited therein.

FIELD OF THE INVENTION

The present disclosure relates generally to data processing, more specifically to security mechanisms that may be employed by an Application Delivery Controller (ADC) to facilitate network access control and prevent malicious attacks such as a denial of service attack.

SUMMARY

According to some embodiments, the present technology is directed to a method for network access control, comprising: (a) receiving at a network device a SYN packet from a client device over a network, the SYN packet comprising identifying information for the client device; (b) determining if the client device is a trusted source for the network using the SYN packet; (c) if the client device is a trusted resource, receiving an acknowledgement (ACK) packet from the client device that includes identifying information for the client device plus an additional value, and identifying information for the network device; and (d) establishing a connection with the network for the client device, (e) otherwise dropping the SYN packet to deny network access to the client device.

According to some embodiments, the present technology is directed to a network arrangement comprising: (a) a network service; and (b) a network device that is configured to: (i) receive a SYN packet from a client device over a network, the SYN packet comprising identifying information for the client device; (ii) determine if the client device is a trusted source for the network using the SYN packet; (iii) if the client device is a trusted resource, receive an acknowledgement (ACK) packet from the client device that includes identifying information for the client device plus an additional value, and identifying information for the network device; and (iv) establish a connection with the network for the client device in such a way that the client device can use the network service, otherwise drop the SYN packet to deny network access to the client device.

According to some embodiments, the present technology is directed to a method for network access control, comprising: (a) determining if a client device is a trusted source for the network using the SYN packet, the SYN packet comprising identifying information for the client device; (b) transmitting a SYN/ACK packet to the client device, the SYN/ACK packet comprising: (1) identifying information for the client device plus an additional value; (2) a SYN cookie, and (3) identifying information for the network device; (c) receiving an ACK packet from the client device to confirm the establishment of a network connection between the network device and the client device; (d) establishing a connection with the network for the client device; and (e) placing the client device on a black list if the client device is subsequently determined to be an untrusted resource.

BRIEF DESCRIPTION OF THE DRAWINGS

Embodiments are illustrated by way of example, and not limitation, in the figures of the accompanying drawings, in which like references indicate similar elements.

DETAILED DESCRIPTION

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices like FPGA's, or various combinations thereof. In particular, the methods described herein may be implemented by a series of computer-executable instructions residing on a storage medium such as a disk drive, or computer-readable medium. It should be noted that methods disclosed herein can be implemented by a computer, e.g., a desktop computer, server, tablet computer, laptop computer, smartphone and so forth.

The present disclosure relates generally to data processing, more specifically to security mechanisms that are employed by an Application Delivery Controller (ADC) to prevent a denial of service attack.

Websites, web and mobile applications, cloud computing, and various web and mobile services have been rising in popularity. Some examples of fast growing consumer services include smart phone applications, location based services, navigation services, e-book services, video applications, music applications, Internet television services, and so forth. Subsequently, more and more servers are deployed within data networks, including the Internet, to accommodate the increasing computing and data storage needs. These servers are typically arranged in data centers or web farms, which may include ADCs, GSLB and/or server load balancers (SLBs).

Conventionally, an ADC is a network device disposed in a datacenter and part of an application delivery network (ADN). The ADC functions to perform common tasks, normally done by web servers, in an effort to remove some load from the web servers. ADCs are typically placed between the firewall/router and the host (web) servers. In addition, conventional ADCs may include various features providing for compression, caching, connection multiplexing, application layer security, and content switching. These features may be combined with basic server load balancing, content manipulation, advanced routing strategies, and highly configurable server health monitoring.

Additionally, ADCs may manage load balancing and delivery of service sessions from client host computers to servers based at least in part on incoming service requests. As more servers are deployed, additional ADCs may be deployed. Similarly, as more servers are pooled together within the data center or spread across multiple data centers to provide scalability, ADCs may become bottlenecks slowing data transmissions between peers on the network.

In TCP/IP networks, one method of establishing a connection between two network devices such as a client device and a server, is through the use of a SYN packet, also sometimes referred to as a SYN flag, to synchronize the sequence numbers of the two devices. In this scenario, the client device that wishes to establish the connection first sends a SYN packet from the client to the server. The SYN packet may comprise information within it such as the source IP address, source port, destination IP address, destination port, and a sequence number for the protocol connection. The sequence number may be used by the TCP stack to reassemble the data stream. The first sequence number sent by a network device initiating the communication may be any value as decided by that originating network device.

In a typical TCP/IP stack, a SYN packet is sent from a client device to a server, in an attempt to establish a network connection with that server. Once the server receives the SYN packet, it typically responds with a SYN/ACK to acknowledge receipt of the SYN packet and the request to establish a connection. Upon receipt of the SYN/ACK, the client device typically responds with an acknowledgement, ACK packet, and the network connection is established. Until the server receives the final ACK packet from the client device, the connection is said to be in the half-open phase.

In a stateful TCP/IP stack, a server typically allocates resources to a particular potential network connection when it receives the initial SYN packet from the client device. When the ACK packet is received, the resource gets allocated to a different state. If a server receives a large amount of SYN packets while in the half-open state, it may become overwhelmed by the amount of resources necessary to respond to all of the SYN packets.

In a typical SYN attack, the server gets overwhelmed by SYN packets coming in at a faster rate than it can process them. This may lead to a denial of service by the server, because the server is overwhelmed by the sheer number of SYN packets it receives, such that it doesn't have enough resources to respond to all of the requests, and thus is unable to respond to any of them.

There may also be other types of attacks on a server, such as a spoof. In this scenario, a SYN packet is sent from one device, but the IP address is spoofed, such that it appears to be coming from a different device's IP address. In this scenario, when a SYN packet is sent by the client device to the server, the server may respond with a typical SYN/ACK to the client device from which it appears the message came from. Since the IP address was spoofed, the SYN/ACK message actually arrives at a different device than originally sent the SYN. Thus, the client device that receives the SYN/ACK message may respond with a "reset" instruction since it did not send the original SYN packet and is not interested in establishing a connection with the server at that time.

Another type of attack that may occur on a server is a botnet attack. In this scenario, there may be attack software, such as a trojan, virus, malware, or any other unauthorized software (e.g., malware), installed on a client device. At periodic intervals, the attack software may attempt to establish a connection between the client device that it resides on and the server, unbeknownst to the user of the client device. Since the IP address of the client device that is sending the SYN packet is a legitimate IP address, it will receive the SYN/ACK message, and respond with an ACK packet to establish a proper connection. Once the connection has been established, the unauthorized software on the client device, may then attempt to overwhelm the server and cause it to shut down, send it a virus, or implement any other type of unauthorized software to interfere with the server's operations.

In a typical TCP/IP stack, when a SYN packet is first received by a server, it retains a copy of the SYN packet received, and allocates resources to respond to the SYN packet. This is known as a stateful solution. In a stateless solution, the server does not allocate any resources until the connection is established.

To help protect against these types of attacks, a SYN-cookie may be placed in a SYN/ACK packet. When a server receives a SYN packet while operating in a stateless mode, it can discard the SYN queue entry and transmit a SYN/ACK response to the client in the form of a SYN-cookie. The data in the SYN-cookie may comprise a sequence number of the server, an acknowledgement of the original SYN request, and other information. When the client device receives this SYN-cookie and replies with an ACK packet, that ACK packet may comprise the sequence number of the client, an acknowledgement of the SYN-cookie, and any other information. When the server recognizes the proper acknowledgement of the SYN-cookie that it sent, it can then confirm that the client device is trying to establish a legitimate connection and the client's IP address has not been spoofed.

A SYN cookie may be an initial sequence number that is carefully constructed according to various rules, including a slowly incrementing timestamp, a maximum segment size value, a cryptographic hash function computed over a network device's IP address and port number, the client's IP address and port number, and the timestamp, or any other value or combination thereof.

The present technology provides various systems and methods for operation of a service on a network. It provides technology to identify botnets, trojans, viruses, malware, and other type of unauthorized services from accessing and overwhelming a network device providing a service. These systems and methods may be utilized to prevent a denial of service attack.

The present technology may be implemented on a network device in a data network such as the Internet including a plurality of switches, routers, virtual switches, web farms, host servers, and other units. The present technology provides enhanced performance and security of a network device such as an Application Delivery Controller (ADC) and allows implementing scalable business solutions for any services, applications, clouds and organizations. Furthermore, the present technology provides a scalable, high-performance application networking platform, which can deliver superior reliability, security, and energy efficiency at lower total cost of ownership. ADC can also provide increased infrastructure efficiency, a faster end user experience, comprehensive Layer 4-7 feature set and flexible virtualization technologies such as Virtual Chassis System, multi-tenancy, and more for public, private and hybrid cloud environments. The network devices may include software and/or hardware components/platforms that may vary depending on a particular application, performance, infrastructure, network capacity, data traffic parameters, and so forth. A more detailed explanation of an exemplary method of ADC operation is described in U.S. utility patent application Ser. No. 13/791,760, filed on Mar. 8, 2013, titled "Application Delivery Controller and Global Server Load Balancer" which is incorporated herein by reference in its entirety.

Figure 1:
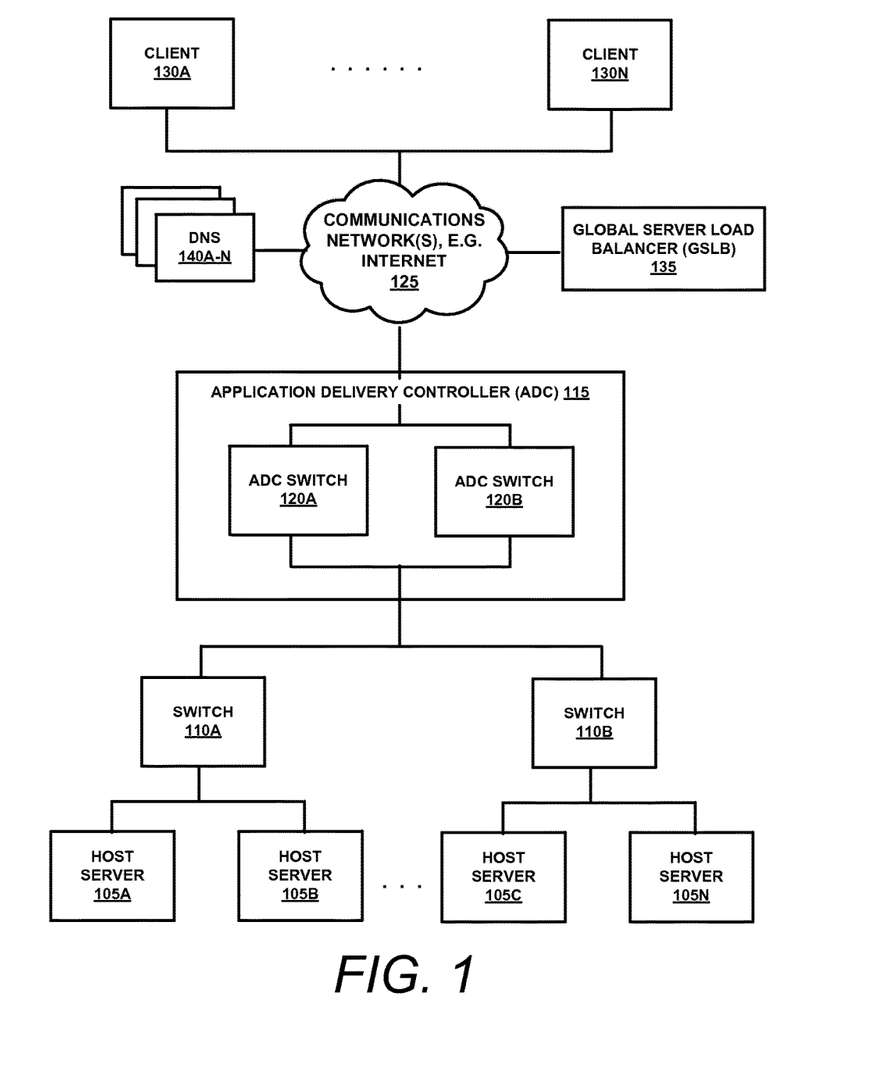
FIG. 1 is a network arrangement that provides network access control in accordance with the present disclosure.

Turning now to FIG. 1, a high-level block diagram of an exemplary symmetric network topology 100 suitable for implementing one or more methods of the present disclosure is shown. The network topology 100 shown by FIG. 1 may include a number of host servers 105A-N, a number of switches, such as switch 110A and switch 110E combining/coupling the host servers 105A-N and thus performing Layer 2 aggregation and corresponding switching. The topology 100 may further include an ADC 115 including one (or more) ADC switches, such as ADC switch 120A and ADC switch 120B. The ADC switches may operate in different modes, such as standalone, active/standby mode, active-Active and others.

The topology 100 may further include a communications network 125, which may refer to, for example, the Internet, Local Area Network (LAN), Wide Area Network (WAN), Internet, a cellular network, a telephone network, or any other switched network or their combinations. There is also a plurality of clients 130A-N, which may include end user computers, mobile phones, thin clients, and so forth. There are also one or more Local DNS Servers 140A-N which may be associated with one or more clients 130A-N and/or one or more host servers 105A-N. As shown in FIG. 1, the topology may include a GSLB 135, which may employ one or more of the methods disclosed herein.

Generally speaking, load balancing is a technique that may be used for distributing the workload evenly across clients, networks, host servers, and other networked resources. The load balancing may enhance utilization of resources and enable maximize throughput with minimum response time, hence avoiding overloading of a single server. Global Server Load Balancing (GSLB) is an extension of the load balancing. With this technology, network traffic is among different web farms, data centers, and host servers located at different geographical locations. This technology may be highly efficient in avoiding local downtimes and remote downtimes. Furthermore, as will be appreciated by those skilled in the art, ADC 115 may act as a master to monitor "health" and responsiveness of other sites hosted by the host servers 105A-N. A GSLB 135 may be configured to redirect service requests to other nearby host servers if one of the host servers does not respond timely. For example, the GSLB 135 may redirect service requests from client 130A for a service from host server 105A to host server 105B if client 130A experiences deleterious performance issues such as latency issues caused by host server 105A underperformance.

Furthermore, this technique may allow forwarding visitor requests to a host server located most closely geographically to the place from where the request sent. In addition, if a traffic threshold is reached at the most geographically proximate host server, the service requests may be forwarded to other host servers located at a different geographical location.

As will be appreciated by those skilled in the art, an ADC switch, such as ADC switch 120A may operate in an active mode, backup mode, or some other modes depending on an application. The ADC switches 120A and 120E provide redundancy protection and failover protection for selected networks or parts of the network 125. The ADC switches 120A and 120E also report their status (i.e., current operating mode) to selected network elements or other switches 110A and/or 110B, for example.

Figure 2:
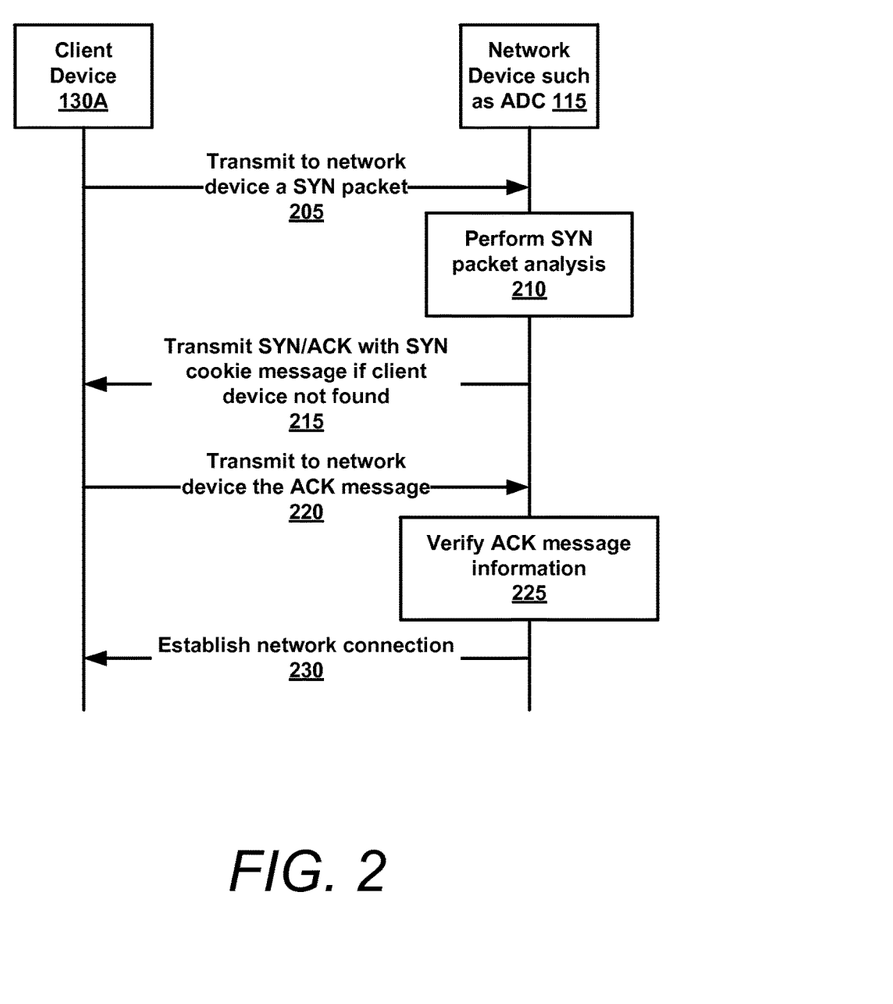
FIG. 2 is a signal flow diagram of a method for establishing a network connection between a client device and a network device.

FIG. 2 illustrates a method of operation for a network device, such as ADC 115, host servers 105A-N, switches 120A-B. The network device is configured to provide network security operations. Broadly described, components of the network 125 use various SYN packet/cookie processes to effectuate security operations. In an example, the client device 130A may be required to transmit a SYN packet prior to registration on the network. Thus, to access a service on the network the client device 130A will transmit to the network a SYN packet. The composition of the SYN packet may be any single or composition of characteristics such as a sequence number, an IP address, a MAC (Media Access Control) address, IMEI (International Mobile Equipment Identity), SSID (Service Set Identifier), a source port, or any other identifying characteristic that can be used to identify a device on a network.

The network device, such as the ADC 115, may receive a SYN packet from a client device 130A to initiate a network connection in step 205. Once received, the network device may perform a SYN packet analysis in step 210. Various methods may be used in the SYN packet analysis.

For example, the network device may then use a lookup table in step 210 to determine whether the client device 130A is already on a white list of trusted devices, or a black list of untrusted devices. The lookup table is in a database, or any other data structure. The lookup table may be stored on computer readable medium on the network device, or in a remote location accessible by the network device. The white list and black list of trusted devices and untrusted devices are recorded in each respective list by source IP address, source port, or any other identifying characteristic in the received SYN packet from the client device 130A. The white list and black list are created and administered by a network administrator, and may be periodically updated. The white list and black list may also incorporate various network policies deployed by the network administrator.

If the client device 130A is found on a black list of devices, SYN packets received from the client device 130A are dropped. That is, the client device 130A is not allowed access to the network.

If the client device 130A that is wishing to initiate the network connection is not found in step 210 on either the white list or the black list, then the network device may send a SYN/ACK message with a SYN-cookie to the client device 130A in step 1215. The SYN-cookie may comprise a sequence number that identifies the network device, an ACK number acknowledging the sequence number from the SYN packet, and/or any other identifying information that is representative of the network device. The SYN cookie is stored on the client device 130A.

In exemplary embodiments, an original SYN packet from a client device 130A may have a sequence number (or other identifying information) that represents the client device 130A. A SYN/ACK packet is returned to the client device 130A from the network device. This SYN/ACK message comprises the client's sequence number (as found in the original SYN packet) plus one, and a sequence number that identifies the network device. An ACK packet/message is subsequently returned by the client device 130A in step 220 to confirm the connection. The ACK packet may comprise the sequence number for the network device network device plus one. The network device verifies the information in the ACK message in step 225 and establishes the network connection in step 230.

Figure 3:
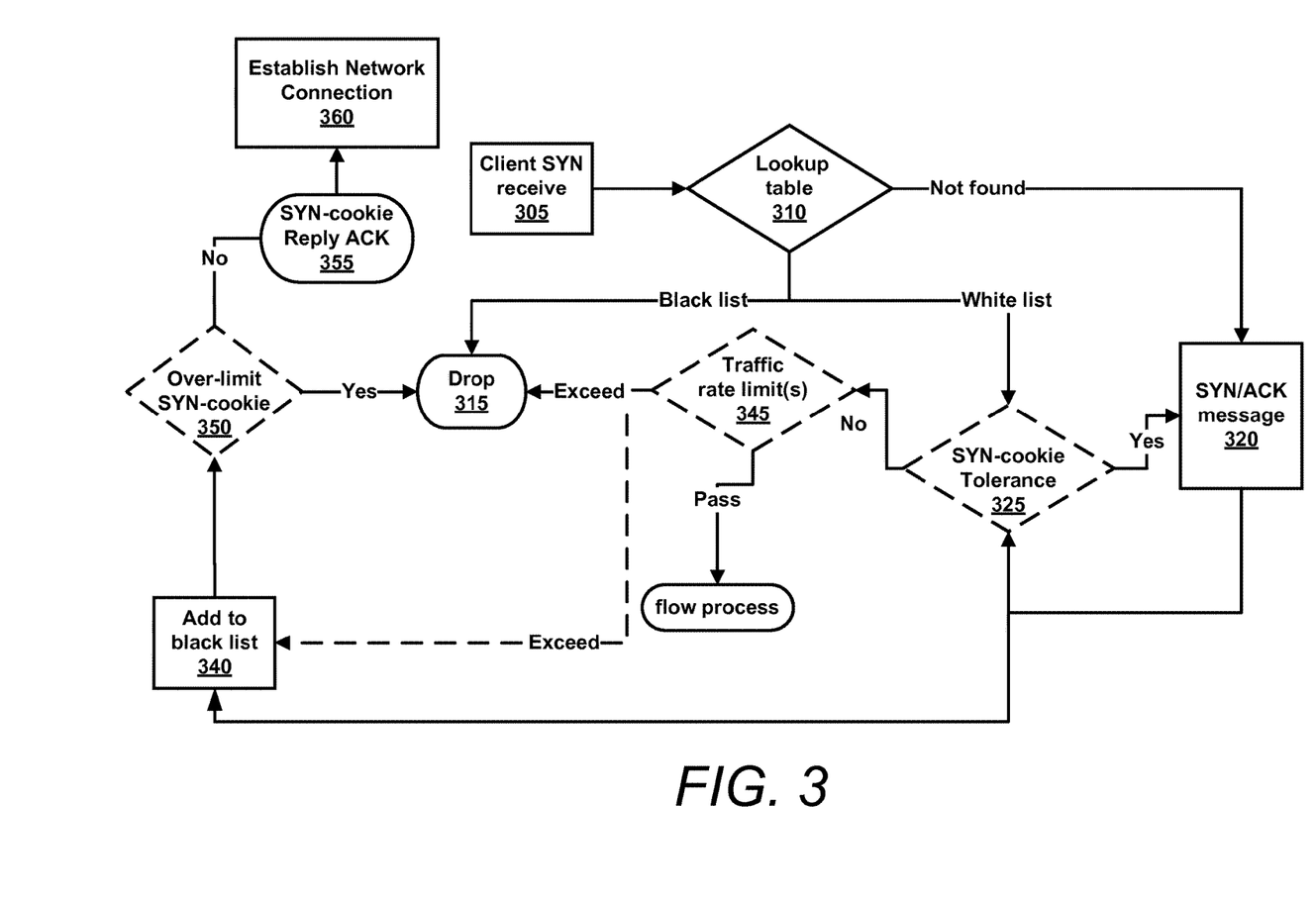
FIGS. 3 and 4 collective illustrate a flowchart of an exemplary method for network access control, used in some instances for protecting a network against a denial of service attack.
Figure 4:
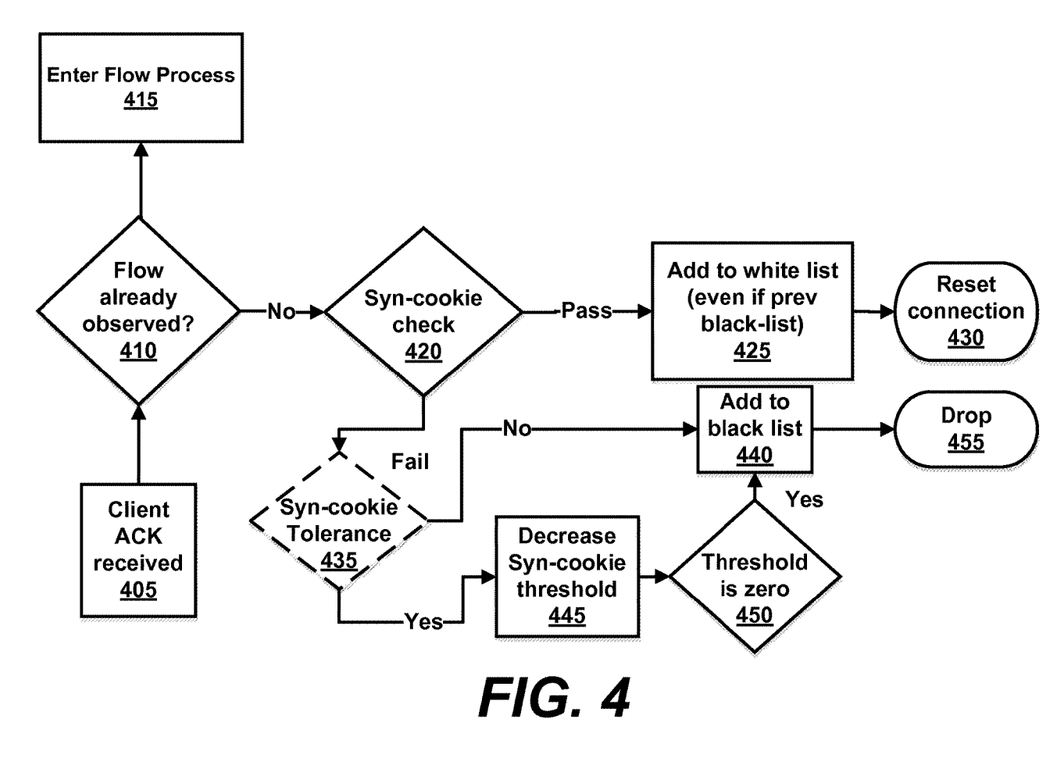

FIGS. 3 and 4 illustrate embodiments of a method where a network administrator may optionally choose to enable a SYN-cookie tolerance level and other optional features. Generally, the process is initiated as above, with the network device receiving a SYN packet from the client device in block 305. Next, the network device looks up the client device as identified in the SYN packet in block 310. If the device is on a blacklist, the SYN packets are dropped in block 315. If the device is not found in a black or white list the network device returns a SYN/ACK message in block 320.

In the event that the client device is on a white list or has been transmitted a SYN/ACK message by the network device, the network device may execute a SYN-cookie tolerance analysis in block 325. In general, a SYN-cookie tolerance level may specify a certain number of times that a client device can fail to return the proper sequence numbers in a SYN-cookie before the client is added to the black list in block 340.

If the client device 130A is already on the white list of trusted sources, then the network device may check whether a SYN-cookie tolerance level for the particular client device 130A has been enabled. It will be understood that there are a number of reasons why a client device may return an improper SYN-cookie in its ACK packet to the network device, such as a networking delay, hardware issues, and so forth. Thus, in some embodiments, the network administrator may have the option of enabling a SYN-cookie tolerance threshold that may specify the number of times a client device must fail to return the matching SYN cookie before the client device is added to the black list in block 340.

If the SYN-cookie tolerance feature is enabled, then the network device may send the client device 130A a SYN/ACK with a SYN cookie. If the SYN cookie tolerance level is not enabled, then the network device may check whether the client device 130A has exceeded a connection rate/limit policy in block 345. A connection rate/limit policy connection rate/limit policy may define a number of times a client device 130A may attempt to connect to the network device in a given time period. The connection rate/limit policy may check one or more characteristics of the client device, such as source IP address, source port, timestamp, or any other characteristic. The specific characteristics that are checked may be configurable by a network administrator, or are predetermined by the network device.

If the client device has exceeded the allowable connection rate/limit policy, then the network device may either simply drop the packet at block 315 and not allow the network connection to be established, or it may add the client device to the black list of untrusted sources in block 340. This determination is, in one embodiment, based on which of the one or more source characteristics have exceeded the allowable rate limit (i.e., source port, IP address, wrong timestamp, and so forth.). Exceeding the allowable connection rate/limit policy may indicate to the network device that the client device may be a botnet, or any other type of unauthorized program that may be attempting to overwhelm the network device and cause it to stop functioning properly. If the client device has exceeded an allowable rate limit and the SYN packet is dropped by the network device in block 315 and no reply is sent to the client device.

In various embodiments, a determination is whether the client device has exceeded a connection rate/limit policy despite being on the white list since the client device may still be a spoof. In a spoof attack, the source IP address may be rotated, but the source port may remain the same. For example, a client device may use an IP address of 123.12.12.1 with a port of :80 in a first instance, and a second IP address 132.34.34.2 with a port of :80 in a second instance.

Thus, querying the number of times a source IP address has attempted to connect to the network device will yield a different result than querying the number of times a source port has attempted to connect to the network device. Therefore, despite being on the white list for trusted sources, the client device may still need to be authenticated by checking the connection rate/limit policy for other characteristics of the client device.

If the connection rate/limit policy(s) has been exceeded for a client device, then the client device may be added to the black list of untrusted sources in block 340. In some embodiments, an unauthorized source may attempt to connect to the network device via constantly guessing a SYN-cookie. In this embodiment, the network device may deploy a check on the rate limit of SYN-cookies received from a particular client in block 345.

If a rate limit or number of SYN-cookies received from a particular source has exceeded a threshold, the SYN packet from the client device may be dropped in block 315. If the rate limit or number of SYN-cookies has not exceeded the threshold, the network device may reply with a SYN-cookie reply ACK in block 355 to begin the network connection. The particular rate limit or number of SYN-cookies that are authorized from a client device may be preset by the network device, or configurable by a network administrator. Additionally, the allowable threshold may be variable based on any characteristic in the SYN packet, such as geographic region, timestamp, source IP address, source port, destination IP address, destination port, and so forth. For example, if the client device is located in a geographical region known for originating malware or fraudster activity, the network administrator may set the rate limit or number of SYN-cookies for that area lower than a more trusted geographical location.

If the connection rate/limit policy has not been exceeded, then a network connection is established between the client device and the network device in block 360, and packets from the client device may enter the flow process for the network.

After receiving a SYN/ACK, when a client returns the ACK packet in block 405, a determination may occur as to whether the particular flow has already been observed in block 410. The determination is based on the sequence numbers in the ACK packet and SYN-cookie, or any other characteristic or combinations thereof.

If the flow was previously observed by the network device, then the packet from the client device may enter the flow process for the network, in block 415. That is, the client device is permitted to use the network connection. If the flow has not been previously observed by the network device, then the SYN-cookie returned by the client device with the ACK packet may be checked by the network device in block 420. If the SYN-cookie is determined to be correct and the SYN-cookie check passes, then the client device is added to the white list in block 425, even if the client device was previously on the black list. The network connection is reset between the network device and client device in block 430.

If the SYN-cookie check fails, then the network device may determine whether an optional SYN-cookie tolerance level has been enabled in block 435. If not, then the client device may be added to the black list in block 440 and the packet may be dropped by the network device in block 455 such that no return message is sent to the client device and no connection is established. If a SYN-cookie tolerance level is enabled, then the SYN-cookie threshold may be decreased by one in block 445. Since the client has failed to return the proper SYN-cookie, the threshold level is decreased. For example, if the initial SYN-cookie tolerance level is five attempts, the first time the client device fails to return the proper SYN-cookie, the tolerance level may be decreased by one such that four attempts are remaining. Each improper SYN-cookie return results in a decrease of the tolerance level in an iterative fashion, until the threshold reaches zero in block 450 such that no more attempts remain. If the threshold has reached zero, then the client device is to the black list and the packet may be dropped by the network device in block 455.

The SYN-cookie check and SYN-cookie tolerance may be employed in various embodiments to prevent an ACK attack. An ACK attack may occur when a client device repeatedly sends ACK packets to a network device by continually attempting to reconstruct the SYN-cookie. Thus, in certain embodiments, it may be beneficial to limit the number of ACK packets the network device may receive from a client device that do not pass the SYN-cookie check.

Figure 5:
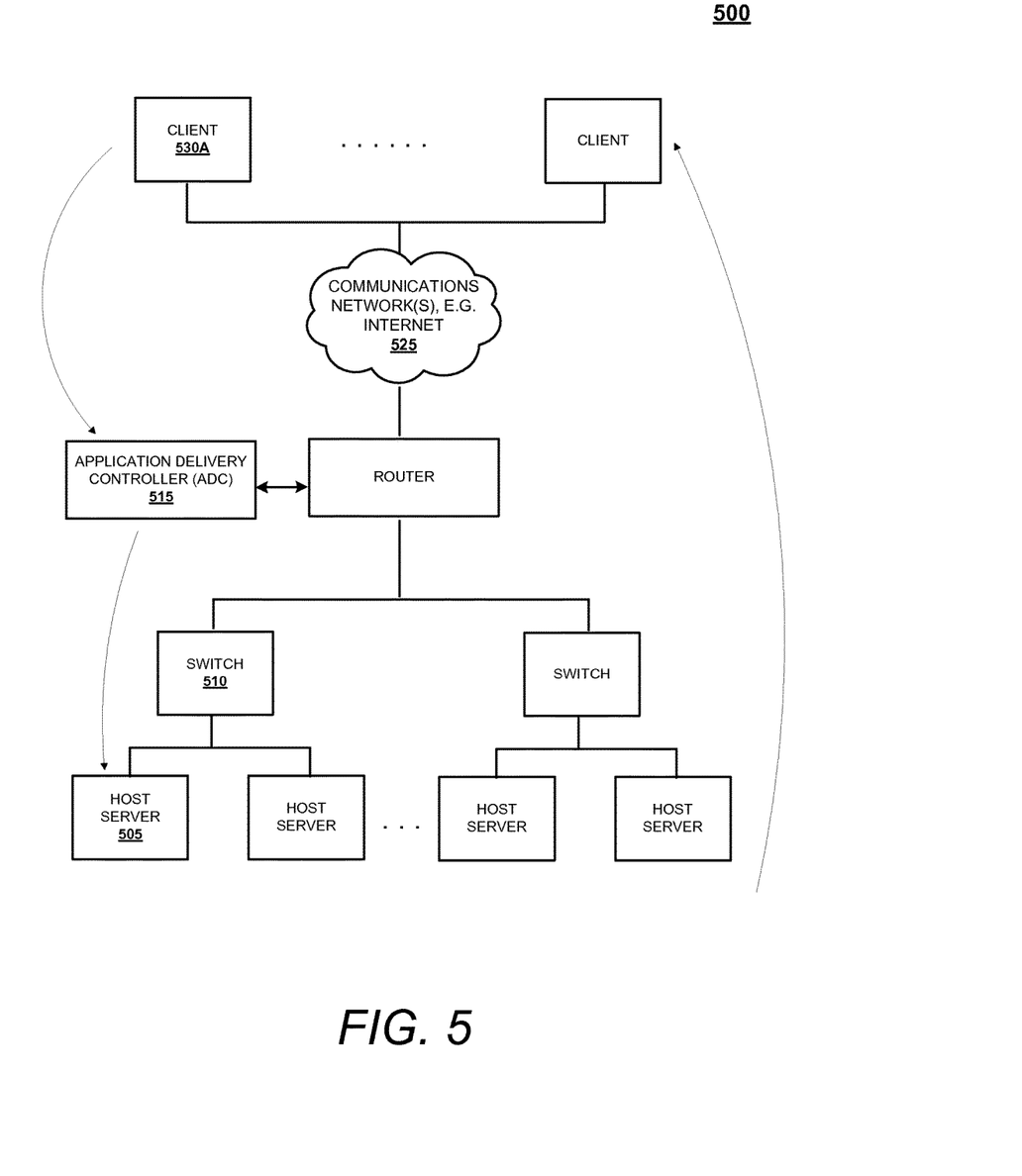
FIG. 5 is a block diagram of another exemplary network arraignment suitable for implementing one or more methods of the present disclosure.

FIG. 5 illustrates a block diagram of an exemplary network topology 500 operating in an "Asymmetric" mode, also sometimes known as "Direct Server Return" mode. In this mode, a client 530A may submit a request for services. The request is transmitted through the communications network 525 to the ADC 515. Once the ADC 515 can verify that the client is a trusted source and the request is legitimate using a SYN-cookie or any other verification method, the ADC 515 may forward the request to one or more host servers 505. The one or more host servers 505 may then return the response data directly to the client 530A. Typically, the flow of traffic from the host servers 505 to the client 530A is greater than the flow of traffic from the client 530A to the host servers 505. Thus, by monitoring the traffic in both directions, the ADC 515 may become a bottleneck in the network, since it may not be able to process such large volumes of traffic. By sending the response data directly from the host servers 505 to the client 530A, the ADC 515 has less traffic to process, and is less likely to slow down the flow of traffic in the network.

The above described systems and methods are implemented on a network device positioned in a symmetric (FIG. 1) or asymmetric network topology (FIG. 5). A symmetric network topology may place the network device in line with the flow of traffic between the server and client device, such that all communications between the server and client device pass through the network device. In an asymmetric network topology (FIG. 5), a different path is used for traffic flowing to and from the server, such that the network device placed between the client and server may only see the traffic flow in one direction.

In certain embodiments, the above described methods and system may operate in a stateless mode. In a stateless mode, the network device does not retain a record of previous interactions, and thus each interaction and request by the client device is handled based on information that is received with the request. Through the use of the SYN-cookie, the network device may have enough information to evaluate and authenticate the client device without retaining information about the prior SYN packet received from the client device.

Though the above described methods and systems for operation of network devices have been described for preventing attacks on a network device by instituting rate limits in the context of SYN packets on an TCP/IP network, similar methods and systems may also be applied on other types of networks, including a UDP network. For example, a network device on a UDP network may also determine whether a source rate limit has been exceeded, or institute other metrics or network key performance indicators (KPI).

Figure 6:
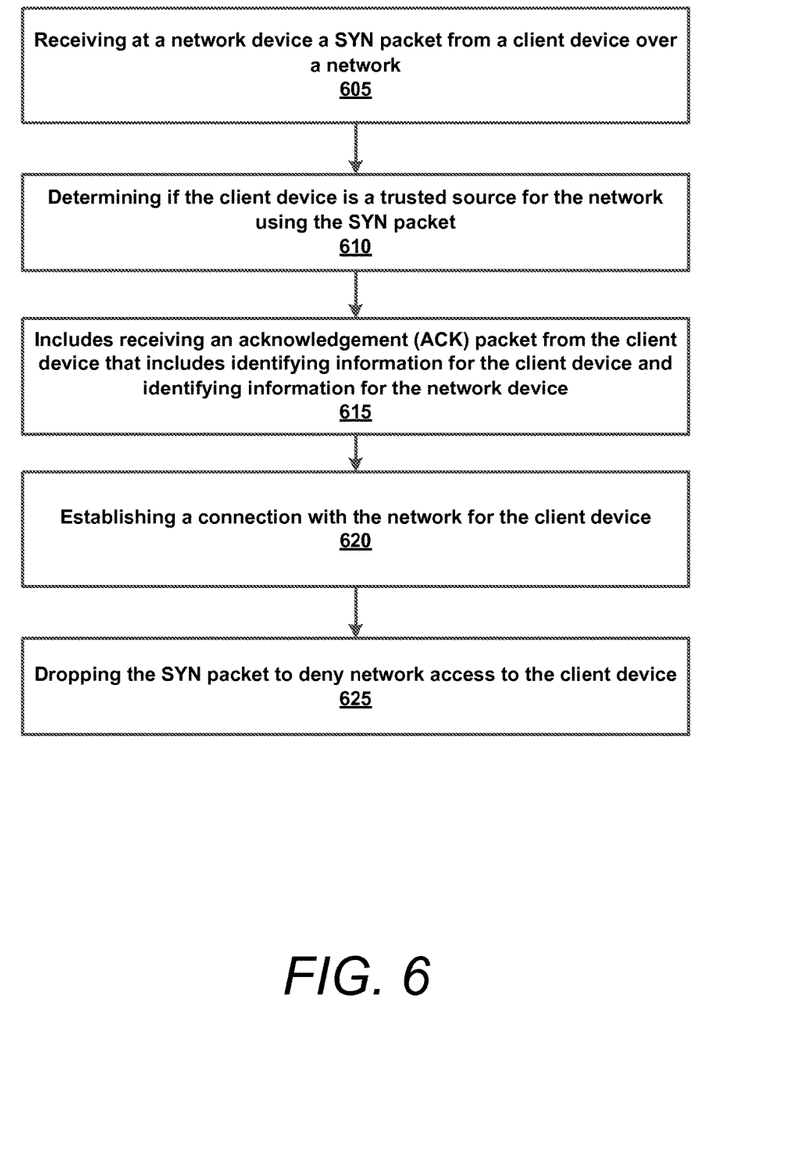
FIG. 6 is a flowchart of a method of network access control.

FIG. 6 is a method for network access control. The method includes receiving at a network device a SYN packet from a client device over a network, in step 605. As mentioned above, the SYN packet comprises identifying information for the client device. Next, the method includes determining if the client device is a trusted source for the network using the SYN packet in step 610. Many different methods may be used to determine if the client device is trusted, such as using a determining if the client device is on a black or white list, determining if the client device has transmitted to the network device a number of ACK packets that include an incorrect SYN cookie, determining if client device has violated an allowable connection rate policy, and/or determining if the client device has exceeded an allowable rate limit of SYN cookies, as well as other methods described herein.

If the client device is a trusted resource, the method further includes receiving an acknowledgement (ACK) packet from the client device that includes identifying information for the client device and identifying information for the network device, in step 615. Next, the method includes establishing a connection with the network for the client device in step 620. If the client device is determined not to be a trusted device, the method may include dropping the SYN packet to deny network access to the client device in step 625.

Figure 7:
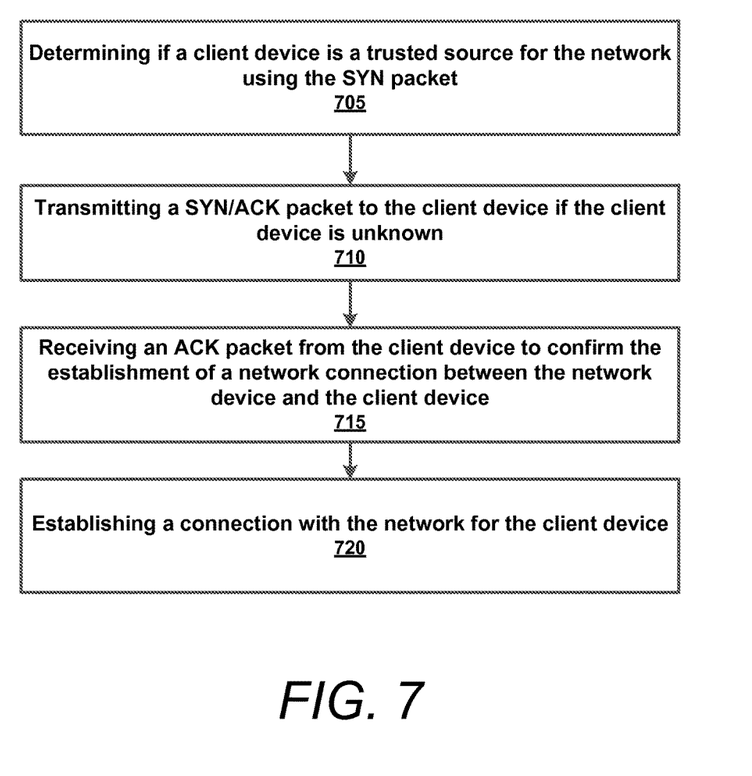
FIG. 7 is a flowchart of another example method of network access control.

FIG. 7 is a flowchart of a method for providing network access. The method may include determining, in step 705, if a client device is a trusted source for the network using the SYN packet. In general, the SYN packet comprises identifying information for the client device such as an IP address, a port, a MAC address or other identifying information.

This information can be searched against a database that includes black and white lists of device identifiers that are known to be untrusted sources (black list) or trusted sources (white list). If the system is unable to determine from the SYN information if the client device is trusted or untrusted, the method includes transmitting a SYN/ACK packet to the client device in step 710. In some embodiments, the SYN/ACK packet comprises: (a) identifying information for the client device plus an additional value; (b) a SYN cookie, and (c) identifying information for the network device.

Next, the method comprises the network device receiving an ACK packet from the client device to confirm the establishment of a network connection between the network device and the client device in step 715. If the ACK packet is received, the method includes establishing, at step 720, a connection with the network for the client device.

During network sessions, the method may include placing the client device on a black list if the client device is subsequently determined to be an untrusted resource. For example, the client device may use an incorrect SYN cookie a certain number of times. In another example the client device may violate an allowable connection rate policy or may be found to create a network packet flow has been not been previously observed within the network. Any of these examples may indicate that the client device is acting maliciously on the network. In these instances, the client device can be placed onto a black list and its future network packets dropped so as to prevent the establishment of a network connection for the client device with the network.

Figure 8:
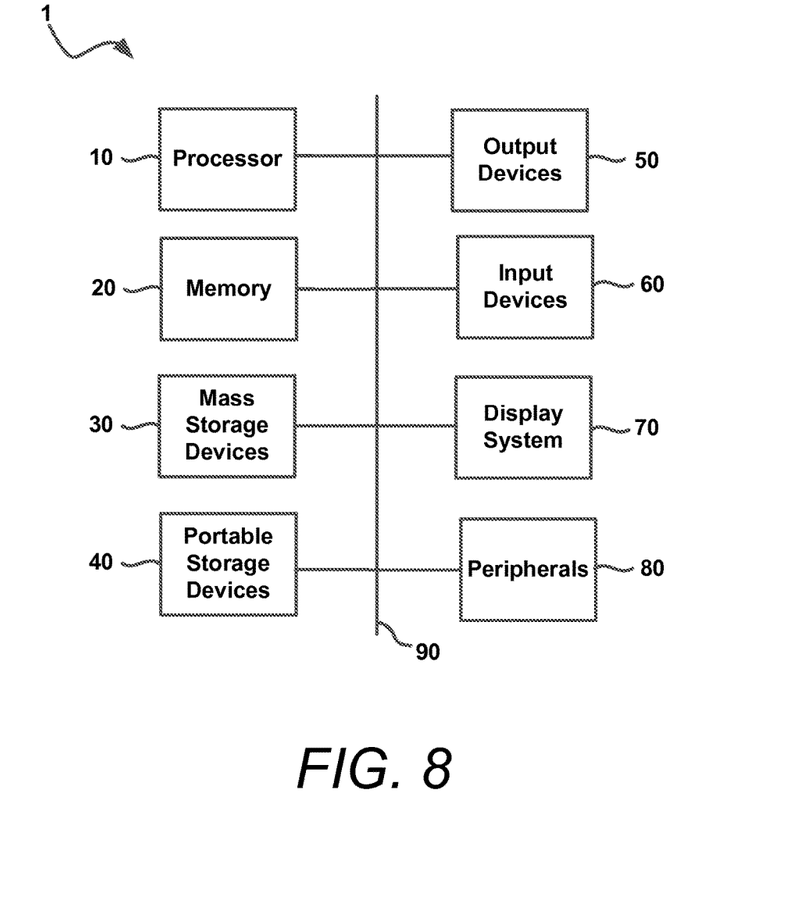
FIG. 8 is a schematic diagram of an example computing device that can be used to implement the present technology.

FIG. 8 illustrates an exemplary computing system 1 that is to implement an embodiment of the present systems and methods. The computing system 1 of FIG. 8 may be implemented in the contexts of the likes of the server 105 described herein. The computing system 1 of FIG. 8 includes a processor 10 and main memory 20. Main memory 20 stores, in part, instructions and data for execution by processor 10. Main memory 20 may store the executable code when in operation. The computing system 1 of FIG. 8 further includes a mass storage device 30, portable storage device 40, output devices 50, user input devices 60, a display system 70, and peripherals 80.

The components shown in FIG. 8 are depicted as being connected via a single bus 90. The components may be connected through one or more data transport means. Processor 10 and main memory 20 may be connected via a local microprocessor bus, and the mass storage device 30, peripherals 80, portable storage device 40, and display system 70 may be connected via one or more input/output (I/O) buses.

Mass storage device 30, which may be implemented with a magnetic disk drive or an optical disk drive, is a non-volatile storage device for storing data and instructions for use by processor 10. Mass storage device 30 can store the system software for implementing embodiments of the present technology for purposes of loading that software into main memory 20.

Portable storage device 40 operates in conjunction with a portable non-volatile storage medium, such as a floppy disk, compact disk or digital video disc, to input and output data and code to and from the computing system 1 of FIG. 8. The system software for implementing embodiments of the present technology may be stored on such a portable medium and input to the computing system 1 via the portable storage device 40.

Input devices 60 provide a portion of a user interface. Input devices 60 may include an alphanumeric keypad, such as a keyboard, for inputting alphanumeric and other information, or a pointing device, such as a mouse, a trackball, stylus, or cursor direction keys, or a scanner for reading bar codes. Additionally, the system 1 as shown in FIG. 8 includes output devices 50. Suitable output devices include speakers, label and receipt printers, network interfaces, and monitors.

Display system 70 may include a liquid crystal display (LCD) or other suitable display device. Display system 70 receives textual and graphical information, and processes the information for output to the display device.

Peripherals 80 may include any type of computer support device to add additional functionality to the computing system. Peripherals 80 may include a modem or a router.

The components contained in the computing system 1 of FIG. 8 are those typically found in computing systems that may be suitable for use with embodiments of the present technology and are intended to represent a broad category of such computer components that are well known in the art. Thus, the computing system 1 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, PHP, MySQL, HTML, Java Script, CSS, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the present invention has been described in connection with a series of preferred embodiment, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for network access control, comprising:
   receiving at a network device a SYN packet from a client device over a network, the SYN packet comprising identifying information for the client device;
   determining whether the client device is a trusted source, an untrusted source, or neither the trusted source nor the untrusted source for the network using the SYN packet;
   when the client device is not the trusted source for the network, dropping the SYN packet to deny network access to the client device;
   when the client device is neither the trusted source nor the untrusted source for the network:
   transmitting to the client device a SYN/ACK packet, the SYN/ACK packet comprising a SYN cookie, the SYN cookie comprising one or more of: a maximum segment size value and a cryptographic hash function computed using at least one of the network device's IP address, the network device's port number, the client device's IP address, and the client device's port number; and
   receiving an acknowledgement (ACK) packet from the client device that includes identifying information for the client device, identifying information for the network device, and the SYN cookie;
   querying an allowable rate limit policy to determine whether a number of times the client device provided an incorrect SYN cookie in one or more ACK packets when attempted to connect to the network device exceeds a predetermined threshold;

when the number of times the client device provided the incorrect SYN cookie is below the predetermined threshold, establishing the connection with the network for the client device;

and when the client device is the trusted source for the network:

receiving an ACK packet from the client device that includes identifying information for the client device and identifying information for the network device; and establishing a connection with the network for the client device, based on the received ACK packet at the network device, wherein the establishing comprises connecting the client device to a host server such that network traffic flows directly from the host server to the client device.

2. The method according to claim 1, wherein determining if the client device is the trusted source, the untrusted source, or neither the trusted source nor the untrusted source for the network using the SYN packet comprises determining if the client device is on a white list of client devices and determining if the client device is on a black list of client devices.

3. The method according to claim 1, wherein the identifying information for the client device comprises any of a sequence number, an IP address, a media access control (MAC) address, an international mobile station equipment identity (IMEI) number, a service set identifier (SSID), or a source port.

4. The method according to claim 1, wherein the identifying information for the network device comprises any of a sequence number, an IP address, a media access control (MAC) address, an international mobile station equipment identity (IMEI) number, a service set identifier (SSID), or a source port.

5. The method according to claim 1, wherein determining if the client device is neither the trusted source nor the untrusted source for the network using the SYN packet comprises:

determining that the client device is neither on a white list nor a black list of client devices.

6. The method according to claim 5, further comprising:

receiving a number of ACK packets from the client device that include the incorrect SYN cookie, wherein the incorrect SYN cookie comprises identifying information for the client device or the network device that is incorrect;

applying a SYN cookie tolerance level, wherein the SYN cookie tolerance level specifies the number of times the client device can supply the incorrect SYN cookie;

adding the identifying information for the client device to a black list if the client device exceeds the SYN cookie tolerance level; and dropping subsequent SYN or ACK packets received from the client device.

7. The method according to claim 1, further comprising:

setting an allowable connection rate policy for the client device, wherein the allowable connection rate policy specifies a number of times the client device may attempt to connect to the network in a given time period;

adding the identifying information for the client device to a black list if the client device violates the allowable connection rate policy; and dropping subsequent SYN or ACK packets received from the client device.

8. The method according to claim 7, wherein a client device is added to a black list even if the client device is currently included in a white list, based upon the client device violating the allowable connection rate policy.

9. The method according to claim 1, further comprising:

setting an allowable rate limit of SYN cookies, wherein the allowable rate limit of SYN cookies specifies a number of times the client device may provide their SYN cookie to the network device;

adding the identifying information for the client device to a black list if the client device exceeds the allowable rate limit of SYN cookies; and dropping subsequent SYN or ACK packets received from the client device.

10. The method according to claim 1, further comprising:

determining if a network packet flow for the client device has been previously observed;

if the network packet flow has been previously observed, establishing the connection with the network; and if the network packet flow has not been previously observed, performing a SYN cookie check and establishing the network connection if the client device passes the SYN cookie check.

11. The method according to claim 10, wherein the SYN cookie check comprises comparing SYN cookie information received in the ACK packet with SYN cookie information provided by the network device in the SYN/ACK packet.

12. The method according to claim 10, further comprising:

setting a SYN cookie threshold, wherein the SYN cookie threshold identifies a total number of times the client device may provide a SYN cookie to the network device;

for each time the client device provides a SYN cookie to the network device, reducing the SYN cookie threshold by one until the SYN cookie threshold is zero;

when the SYN cookie threshold is zero, adding the identifying information for the client device to a black list; and dropping subsequent SYN or ACK packets received from the client device.

13. A network arrangement, comprising:

a network service; and a network device that is configured to:

receive a SYN packet from a client device over a network, the SYN packet comprising identifying information for the client device;

determine whether the client device is a trusted source, an untrusted source, or neither the trusted source nor the untrusted source for the network using the SYN packet;

when the client device is the trusted source:

receive an acknowledgement (ACK) packet from the client device that includes identifying information for the client device plus an additional value, and identifying information for the network device; and establish a connection with the network for the client device in such a way that the client device can use the network service; and when the client device is not the trusted source, drop the SYN packet to deny network access to the client device; and when the client device is neither the trusted source nor the untrusted source for the network:

transmit to the client device a SYN/ACK packet, the SYN/ACK packet comprising a SYN cookie, the SYN cookie comprising one or more of: a maximum segment size value and a cryptographic hash function computed using at least one of the network device's IP address, the network device's port number, the client device's IP address, and the client device's port number;

receive an acknowledgement (ACK) packet from the client device that includes identifying information for the client device, identifying information for the network device, and the SYN cookie;

query an allowable rate limit policy to determine whether a number of times the client device provided an incorrect SYN cookie in one or more ACK packets when attempted to connect to the network device exceeds a predetermined threshold; and when the number of times the client device provided the incorrect SYN cookie is below the predetermined threshold, establish the connection with the network for the client device.

14. The network arrangement according to claim 13, wherein the network device determines if the client device is the trusted source for the network using the SYN packet by determining if the client device is on a white list or a black list of client devices.

15. The network arrangement according to claim 14, wherein the identifying information for the client device comprises any of a sequence number, an IP address, a media access control (MAC) address, an international mobile station equipment identity (IMEI) number, a service set identifier (SSID), or a source port.

16. The network arrangement according to claim 13, wherein the identifying information for the network device comprises any of a sequence number, an IP address, a media access control (MAC) address, an international mobile station equipment identity (IMEI) number, a service set identifier (SSID), or a source port.

17. The network arrangement according to claim 13, wherein the network device determines if the client device is neither the trusted source nor the untrusted source for the network using the SYN packet by:
   determining that the client device is neither on a white list or a black list of client devices.

18. The network arrangement according to claim 17, wherein the network device is configured to:
   receive a number of ACK packets from the client device that include the incorrect SYN cookie, wherein the incorrect SYN cookie comprises identifying information for the client device or the network device that is incorrect;
   apply a SYN cookie tolerance level, wherein the SYN cookie tolerance level specifies the number of times the client device can supply the incorrect SYN cookie;
   set an allowable connection rate policy for the client device, wherein the allowable connection rate policy specifies a number of times the client device may attempt to connect to the network in a given time period; and
   add the identifying information for the client device to a black list if the client device exceeds the SYN cookie tolerance level or if the client device violates the allowable connection rate policy.

19. The network arrangement according to claim 18, wherein the network device is configured to add the client device to a black list even if the client device is currently included in a white list, based upon the client device violating the allowable connection rate policy or exceeding the SYN cookie tolerance level.

20. The network arrangement according to claim 19, wherein the network device is configured to:
   determine if a network packet flow for the client device has been previously observed;
   establish a connection with the network if the network packet flow has been previously observed; and
   if the network packet flow has not been previously observed, perform a SYN cookie check and establish the network connection if the client device passes the SYN cookie check.

21. A method for network access control, comprising:
   determining if a client device is a trusted source for a network using a SYN packet, the SYN packet comprising identifying information for the client device;
   transmitting a SYN/ACK packet to the client device, the SYN/ACK packet comprising identifying information for the client device plus an additional value, a SYN cookie, and identifying information for the network device, the SYN cookie comprising one or more of: a maximum segment size value and a cryptographic hash function computed using at least one of the network device's IP address, the network device's port number, the client device's IP address, and the client device's port number;
   receiving an ACK packet from the client device to confirm the establishment of a network connection between a network device and the client device, the ACK packet including the identifying information for the client device, the identifying information for the network device, and the SYN cookie;
   querying an allowable rate limit policy to determine whether a number of times the client device provided an incorrect SYN cookie in one or more ACK packets when attempted to connect to the network device exceeds a predetermined threshold;
   when the number of times the client device provided the incorrect SYN cookie is below the predetermined threshold, establishing a connection with the network for the client device; and
   placing the client device on a black list if the client device is subsequently determined to be an untrusted source.

* * * * *